3,338,636
SILAGE HANDLING MACHINES
George Roland Chapman, Stafford Road, Palmyra, N.Y. 14522, and Bird J. Smith, Palmyra, N.Y.; said Smith assignor to said Chapman
Filed Dec. 2, 1965, Ser. No. 511,123
9 Claims. (Cl. 302—56)

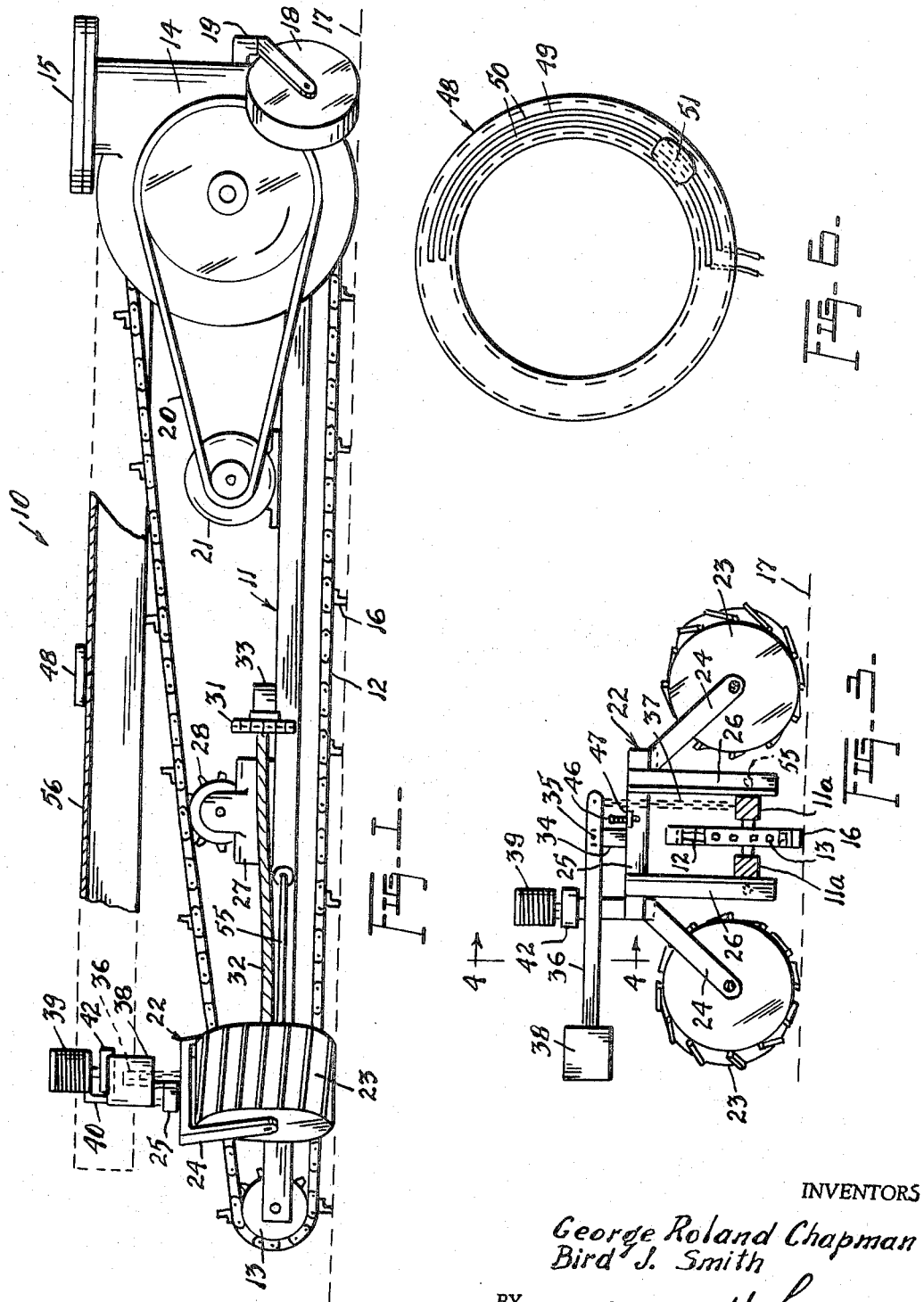

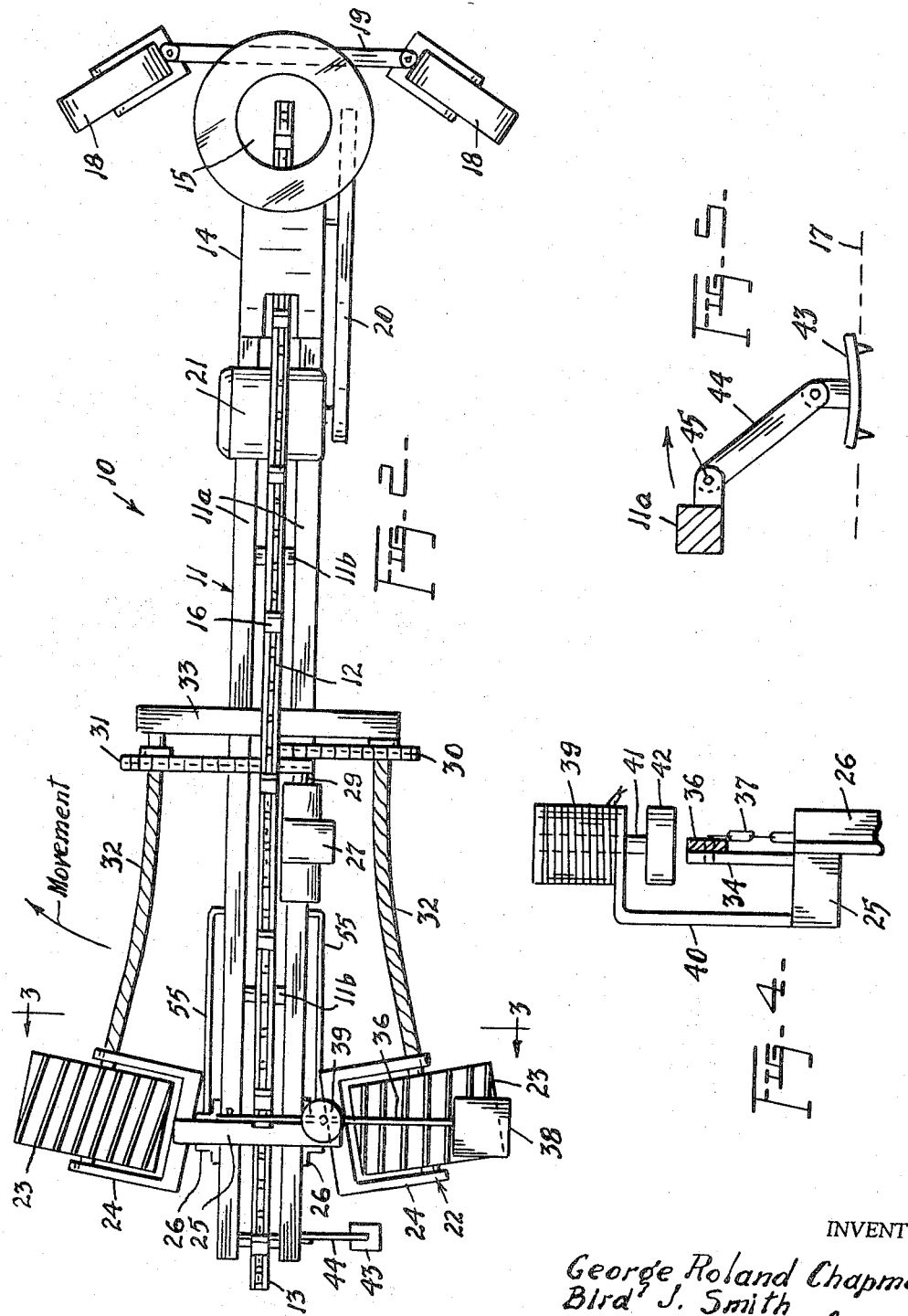

ABSTRACT OF THE DISCLOSURE

This application discloses a silage handling machine including a traveling frame, an endless silage conveyor extending longitudinally of the frame, a traveling carrier for supporting one end portion of the frame for raising and lowering movement, means for driving said conveyor and simultaneously propelling said carrier and means including electromagnetic means for raising and lowering said frame relative to the carrier in automatic response to a predetermined condition of operation.

---

This invention relates to new and useful improvements in silage handling machines of the general type used for discharging silage from a silo, an example of such a type of machines being shown in my Patent No. 2,788,247 dated Apr. 9, 1957.

A machine of this type is positioned for circular traveling movement in a silo and includes an elongated frame which supports an endless silage conveyor. The bottom run of the conveyor scrapes, loosens and delivers the silage to a discharge throat of the machine, as the machine continues in its circular traveling movement on the silage.

Some difficulties have been experienced when the machine is stopped, particularly during cold weather, in that the bottom conveyor run becomes stuck or frozen to the silage, so that when the machine is started again, considerable strain is imposed on the conveyor which often breaks or becomes otherwise defective.

It is, therefore, the principal object of the invention to avoid such difficulties, this being attained by the provision of means for automatically raising the machine frame and conveyor from the silage when the machine is stopped, so that the conveyor is out of contact with the silage and cannot become stuck or frozen thereto.

Also, even under ordinary operating conditions, some difficulties have been encountered when the silage lies unevenly in the silo, as for example, with the top of the silage slanting from one side of the silo to the other. Under such circumstances the machine conveyor works unevenly in its travel around the silo, gradually working its way into a more and more inclined plane, away from a substantially horizontal plane which is desirable for most satisfactory operation.

Thus, another object of the invention is to eliminate the last mentioned difficulty by utilizing the raising of the machine frame and conveyor to even out such sloping of the silage so that the machine may efficiently operate on an even level.

With the foregoing more important objects and features in view and such other objects and features as may become apparent as this specification proceeds, the invention will be understood from the following description taken in conjunction with the accompanying drawings, wherein like characters of reference are used to designate like parts, and wherein:

FIGURE 1 is a side elevational view of the silage handling machine in accordance with the invention;

FIGURE 2 is a top plan view thereof;

FIGURE 3 is a cross-sectional view, taken substantially in the plane of the line 3—3 in FIG. 2;

FIGURE 4 is an enlarged, fragmentary sectional detail, taken substantially in the plane of the line 4—4 in FIG. 3;

FIGURE 5 is an enlarged, fragmentary detail of the frame supporting shoe; and

FIGURE 6 is an enlarged plan view of the mercury switch used in the invention.

Referring now to the accompanying drawings in detail, the silage handling machine is designated generally by the reference numeral 10 and embodies in its construction a substantially horizontal, elongated frame 11 such as may conveniently consist of a pair of spaced parallel longitudinals 11a connected together by cross pieces 11b. An endless chain or belt conveyor 12 extends longitudinally of the frame 11, passing around a sprocket or pulley 13 at the outer end of the frame and around a similar sprocket or pulley (not shown) inside a blower housing 14 at the inner end of the frame, the housing 14 having a silage discharge throat 15, as will be clearly apparent. The conveyor 12 is equipped with suitable slats, scoops, or the like, 16, which along the bottom run of the conveyor scrapingly engage the silage to loosen and deliver the same into the housing 14 for discharge through the throat 15. The top surface of the silage in a silo is indicated by the dotted line 17.

The inner end of the machine more-or-less rests on the silage with the assistance of a roller 18 supported as for example at 19 from the housing 14, and the conveyor 12 is driven through the medium of a belt drive 20, or the like, by an electric motor 21 mounted on the frame 11.

In accordance with the invention the outer end portion of the machine frame 11 is supported by a traveling carrier 22 for raising and lowering movement relative to the carrier and to the silage 17. The carrier 22 consists of a pair of silage engaging rollers 23 which are rotatably mounted in suitable yokes 24 at opposite sides of the frame 11, the yokes 24 being attached to a cross bar 25 which overlies the frame 11 in upwardly spaced relation therefrom, as is best shown in FIG. 3. Pairs of uprights 26 are secured to the end portions of the cross bar 25 and extend downwardly therefrom at opposite sides of the frame 11, so that the frame is free to move upwardly or downwardly between these uprights to effect its raising or lowering relative to the carrier 22 and hence relative to the silage 17.

For propelling the machine around the silo, a gear reduction drive 27 is mounted intermediate the ends of the frame 11 and includes a pulley or sprocket 28 which is driven by the conveyor belt or chain 12 at the underside of the upper run of such belt or chain. The drive 27 has an output shaft 29 (see FIG. 2) operatively connected by endless chain drives 30, 31 to a pair of flexible drive shafts 32 which are coupled directly to the two aforementioned rollers 23 of the carrier 22. The ends of the drive shafts 32 adjacent the chain drives 30, 31 are journalled in a cross piece 33 secured to the frame 11, and it will be apparent that by virtue of the flexible drive shafts 32, rotation may be imparted to the rollers 23 notwithstanding any raising or lowering of the frame 11 relative to the carrier 22 and its rollers.

An upstanding bracket 34 is secured to the cross bar 25 and has a fulcrum or pivot 35 on which is mounted a balancing lever 36. One end of this lever is connected, as by a chain 37, to the frame 11, while the other end of the lever carries a counterweight 38 which is heavy enough to nearly balance the gravitational effect of the frame 11 and conveyor 12 so that the lower run of the conveyor easily rests on the silage 17.

An electro-magnet 39 is mounted by a suitable bracket 40 on the cross bar 25 above the lever 36 between the fulcrum 35 and the weight 38. The electro-magnet 39 has a vertically slidable pole piece or armature 41 which is provided at its lower end with a weight 42 (see FIG. 4), the arrangement being such that when the electro-magnet is energized, the armature 41 is slid upwardly and the weight 42 is out of contact with the lever 36. However, upon de-energization of the magnet, the armature 41 slides downwardly and the weight 42 comes into engagement with the lever 36, pressing downwardly upon the same and causing the other end of the lever to swing upwardly, thus raising the frame 11 by the chain 37.

The electro-magnet 39 is connected in parallel to the driving motor 21 and, when the motor is energized to drive the conveyor 12 and to propel the rollers 23 of the carrier 22, the magnet 39 is also energized so that the weight 42 is out of contact with the lever 36 and the counterweight 38 acts through the lever 36 to permit the lower run of the conveyor 12 to rest upon the silage 17. However, when the machine is shut down at the end of its use, de-energization of the magnet 39 drops the weight 42 on the lever 36, the weight being sufficiently heavy to overbalance the lever and cause the frame 11 with the conveyor 12 to be raised relative to the carrier 22 and also relative to the silage 17, so that the lower run of the conveyor is elevated from the silage and cannot become stuck or frozen thereto while the machine is idle.

If desired, a silage engaging shoe 43, pivotally attached to an arm 44, may be used to sustain the frame in its elevated position once the frame has been raised by de-energization of the magnet 39. The arm 44 of the shoe is pivoted at 45 to the frame 11 and projects laterally therefrom as shown in FIG. 2, the operation of the shoe being substantially the same as in my aforementioned Patent No. 2,788,247.

Means may be provided for limiting the extent of lowering of the frame 11 relative to the carrier 22, so as to correspondingly limit the extent to which the lower run of the conveyor 12 may penetrate into the silage 17. Such limiting means may take the form of an adjustable screw 46 carried by a lug 47 on the cross bar 25 (see FIG. 3), the screw head being adapted to abut the lever 36 when the lever is pulled downwardly by the chain 37.

While the frame 11 is guided in its vertical movement relative to the carrier 22 by the uprights 26 of the carrier, a pair of guiding rods 55 are pivoted to opposite sides of the frame 11 and to the uprights 26 of the carrier, as shown. Moreover, an elongated, inverted channel-shaped cover 56 is provided above the upper run of the conveyor 12, one end of the cover being pivoted to the blower housing 14 while its other end portion is similarly pivoted to the carrier 22. The cover 56 not only protectively overlies the upper run of the conveyor, but also acts as a stabilizer to prevent rocking or tilting of the carrier 22 toward and away from the silo side wall.

Means may also be provided for raising the conveyor 12 with its frame 11 independently of stoppage of the driving motor 21, as for example, in instances where the level of silage slopes from one side of the silo to the other and where continued operation of the machine in an inclined plane would continue to increase the silage slope, it being understood that operation of the machine in a substantially horizontal plane is preferable for most efficient results. Thus, the last mentioned means involves the provision of an annular mercury switch 48 which may be conveniently mounted on the aforementioned cover 56. As shown in FIG. 6, the switch has an annular housing 49 of glass, plastic or other insulating material, containing a pair of concentric, semi-circular conductors 50 and a bubble of mercury 51 which is free to roll inside the housing. When the machine is traveling over level silage, the mercury bubble 51 is in that portion of the housing where it electrically bridges the conductors 50 which are connected in series with the electro-magnet 39. Under such circumstances the magnet remains energized to keep the weight 42 out of contact with the lever 36. However, when the machine approaches a slant or incline in the silage, the mercury bubble 51 moves by gravity to the relatively opposite side of the housing 49 where it no longer bridges the conductors 50. Thus, the circuit to the magnet 39 is broken and the weight 42 causes the frame 11 with the conveyor 12 to be raised off the silage, until such time as the machine moves onto substantially level silage where conveyor engagement with the silage is again desirable.

The aforementioned cover 56 has been shown partly by full lines and partly by dotted lines in FIG. 1, but has been omitted in FIGS. 2 and 3 for clarity of illustration of the machine itself.

While in the foregoing there has been described and shown the preferred embodiment of the invention, various modifications may become apparent to those skilled in the art to which the invention relates. Accordingly, it is not desired to limit the invention to this disclosure, and various modifications and equivalents may be resorted to, falling within the spirit and scope of the invention as claimed.

What is claimed as new is:

1. In a silage handling machine, the combination of an elongated traveling frame, an endless silage conveyor extending longitudinally of said frame, a traveling carrier supporting one end portion of the frame for raising and lowering movement, means for driving said conveyor and simultaneously propelling said carrier, and means including electromagnetic means for raising and lowering said frame relative to said carrier in automatic response to a predetermined condition of operation.

2. The machine as defined in claim 1 wherein said electromagnetic means is responsive to cessation of operation of said driving and propelling means.

3. The machine as defined in claim 1 wherein said electromagnetic means is responsive to inclination of said carrier from a substantially horizontal plane.

4. In a silage handling machine, the combination of an elongated traveling frame having an inner end and an outer end, an endless silage conveyor extending longitudinally of said frame, a traveling carrier supporting the outer end portion of said frame for raising and lowering theeof relative to a bed of silage on which the inner end of the frame rests, an electric motor for driving said conveyor and simultaneously propelling said carrier, and electro-magnetic means in circuit with said motor for permitting said frame to remain lowered when the motor is in operation, said electro-magnetic means being operative to raise said frame when supply of current to said motor is discontinued.

5. The machine as defined in claim 4 together with switch means in circuit with said electro-magnetic means and responsive to inclination of said carrier from a substantially horizontal plane for raising said frame independently of operation of said motor.

6. The machine as defined in claim 4 wherein said electro-magnetic means include a counterweighted lever fulcrummed on said carrier and operatively connected at one side of its fulcrum to said frame, an electro-magnet mounted on said carrier and having a vertically slidable armature slid upwardly when the electro-magnet is energized, and a weight carried by said armature, said weight being engageable with said lever at the relatively opposite side of its fulcrum when the electro-magnet is de-energized, whereby to overbalance the lever and cause said frame to be raised.

7. The machine as defined in claim 6 together with adjustable stop means provided on said carrier and engageable by said lever to limit the extent of lowering of said frame.

8. The machine as defined in claim 6 together with switch means in circuit with said electro-magnet and responsive to inclination of said carrier from a substantially horizontal position for deenergizing the electro-magnet independently of operation of said motor.

9. The machine as defined in claim 4 together with shoe means pivotally connected to the outer end portion of said frame for maintaining the same in its raised position upon raising of the frame by said electro-magnetic means.

References Cited

UNITED STATES PATENTS

| | | | |
|---|---|---|---|
| 2,671,696 | 3/1954 | McLean | 302—56 |
| 2,788,247 | 4/1957 | Chapman | 302—56 |
| 3,017,044 | 1/1962 | Englemann | 214—17 |
| 3,217,907 | 11/1965 | Buschbom | 214—17 |

EVON C. BLUNK, *Primary Examiner.*